(12) United States Patent
Jain et al.

(10) Patent No.: US 10,956,449 B2
(45) Date of Patent: Mar. 23, 2021

(54) OLAP ENGINE WORKLOAD DISTRIBUTION USING COST BASED ALGORITHMS

(71) Applicant: International Business Machines Corporation, Armonk, NY (US)

(72) Inventors: Chandrashekhar K. Jain, Pune (IN); Sonia L. Sequeira, Pune (IN)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 14/692,950

(22) Filed: Apr. 22, 2015

(65) Prior Publication Data

US 2016/0314181 A1    Oct. 27, 2016

(51) Int. Cl.
  *G06F 16/00* (2019.01)
  *G06F 16/28* (2019.01)
  *G06F 16/2453* (2019.01)

(52) U.S. Cl.
  CPC ...... *G06F 16/283* (2019.01); *G06F 16/24542* (2019.01)

(58) Field of Classification Search
  CPC .......................... G06F 16/283; G06F 16/2452
  See application file for complete search history.

(56) References Cited

U.S. PATENT DOCUMENTS

| 7,761,407 | B1 | 7/2010 | Stern | |
| 2009/0287666 | A1* | 11/2009 | DeKimpe | G06F 17/30592 |
| 2012/0143920 | A1* | 6/2012 | Vinnakota | G06Q 10/06 707/797 |
| 2013/0318031 | A1 | 11/2013 | Bawa et al. | |
| 2014/0380322 | A1* | 12/2014 | Ailamaki | G06F 9/4843 718/102 |

OTHER PUBLICATIONS

Dehne, et al; "Parallelizing the Data Cube" Distributed and Parallel Databases, 11,181-201, 2002 ; Kluwer Academic Publishers, Manufactured in the Netherlands.

* cited by examiner

*Primary Examiner* — Usmaan Saeed
*Assistant Examiner* — Paul Kim
(74) *Attorney, Agent, or Firm* — Alexis N. Hatzis

(57) ABSTRACT

One or more processors divide an OLAP cube into one or more cubelets. One or more processors determine a weight corresponding to each node present within each of the one or more cubelets. One or more processors determine a total cost corresponding to each of the one or more cubelets. One or more processors assign execution of a portion of a workload corresponding to each of the one or more cubelets to a data processing element. The assignment of the execution of the portion of the workload corresponding to a cubelet to a data processing element is based on the determined total cost corresponding to the cubelet.

15 Claims, 6 Drawing Sheets

OLAP ENGINE WORKLOAD DISTRIBUTION USING COST BASED ALGORITHMS

BACKGROUND OF THE INVENTION

The present invention relates generally to the field of analytics and more particularly to online analytical processing.

Business intelligence tools such as online analytical processing (OLAP) are used to manipulate data for the purpose of identifying trends and patterns included in that data. For example, a company may want to know how many of a specific product are being sold in a specific city over a specific period of time. In order to produce these insights into trends and patterns, information stored in a database is queried to remove a portion of data corresponding to the specific location or time period of interest. Various implementations of OLAP systems can require anywhere from only a few to tens of millions of records to be examined for trends and patterns.

SUMMARY

Embodiments of the invention disclose a method, computer program product, and computer system for distributing a workload of an online analytical processing (OLAP) cube. One or more processors divide an OLAP cube into one or more cubelets. One or more processors determine a weight corresponding to each node present within each of the one or more cubelets. One or more processors determine a total cost corresponding to each of the one or more cubelets. One or more processors assign execution of a portion of a workload corresponding to each of the one or more cubelets to a data processing element. The assignment of the execution of the portion of the workload corresponding to a cubelet to a data processing element is based on the determined total cost corresponding to the cubelet.

DETAILED DESCRIPTION

Figure 1:
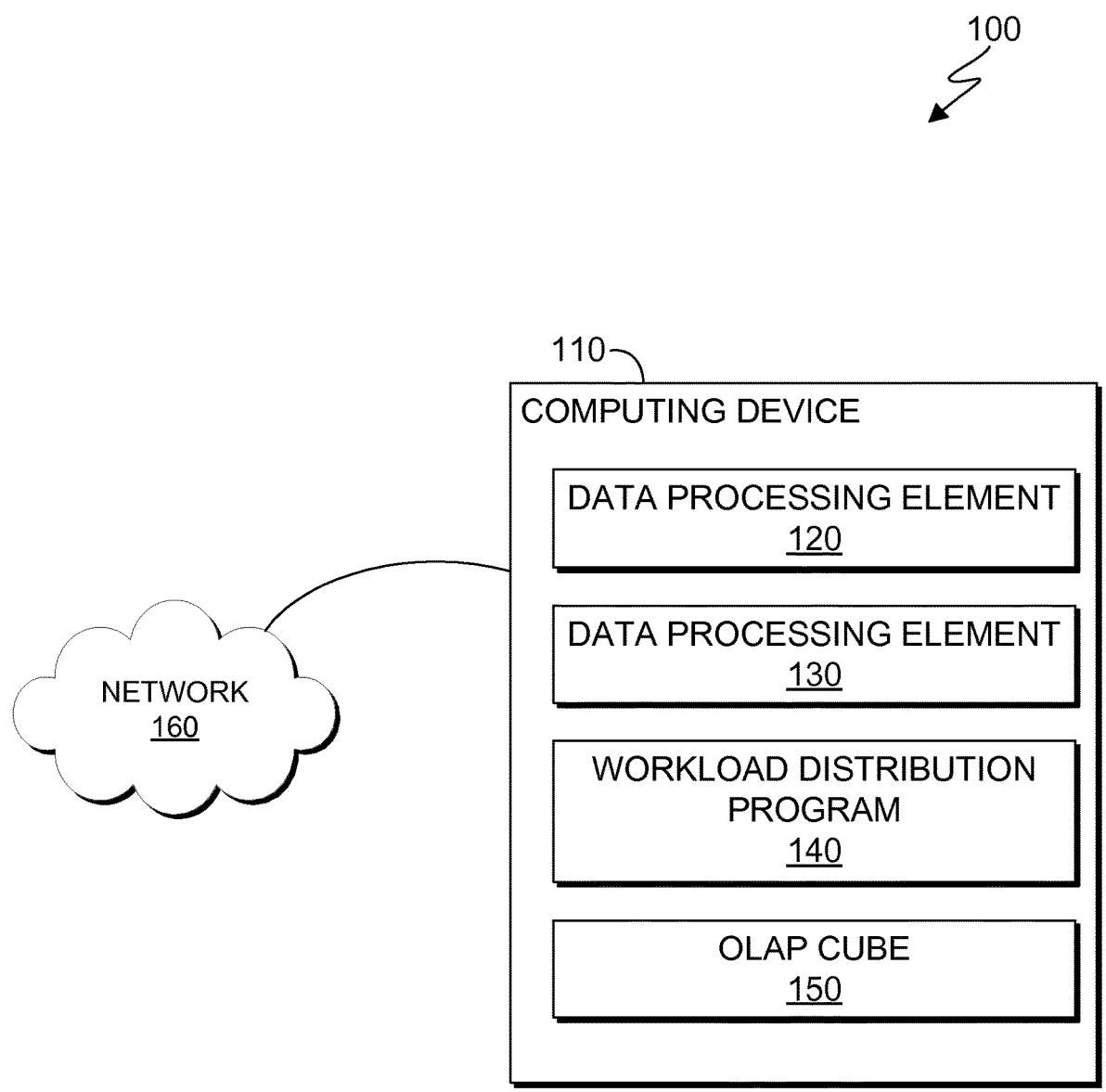
FIG. 1 is a block diagram depicting a computing environment including a computing device executing a workload distribution program, in accordance with an embodiment of the invention.

The present invention will now be described in detail with reference to the Figures. FIG. 1 is a functional block diagram illustrating a computer system, generally designated 100, in accordance with one embodiment of the present invention.

In general, embodiments of the present invention provide an approach for distributing the execution of a workload involving portions of an OLAP cube to one or more data processing elements included within a computing device. The purpose of the workload distribution program is to schedule the execution of the workload such that the workload will be completed as quickly as possible.

FIG. 1 is a block diagram depicting computing environment 100, in accordance with an embodiment of the invention. Computing environment 100 includes computing device 110, data processing elements 120 and 130, workload distribution program 140, OLAP cube 150, and network 160.

In various embodiments of the invention, computing device 110 can be a server, laptop computer, tablet computer, netbook computer, personal computer (PC), or a desktop computer. In another embodiment, computing device 110 represents computing systems using clustered computers and components to act as a single pool of seamless resources. In general, computing device 110 can be any computing device or a combination of devices with access to data processing elements 120 and 130 and OLAP cube 150, and is capable of executing workload distribution program 140. Computing device 110 may include internal and external hardware components, as depicted and described in further detail with respect to FIG. 6.

In various embodiments of the invention, computing device 110 includes one or more data processing elements such as central processing units (CPUs), CPU cores, graphics processing units (GPUs), field-programmable gate arrays (FPGAs), and application-specific integrated circuits (ASICs), or any other data processing element capable of performing computation or executing computer-readable program instructions. In the depicted embodiment, computing device 110 includes data processing elements 120 and 130 which are each of the two cores of dual core CPU 604. In various embodiments, data processing elements 120 and 130 are data processing elements capable of processing information, performing computation, and executing computer-readable program instructions at the same rate, as described in greater detail with respect to FIG. 6. In the depicted embodiment, data processing elements 120 and 130 are equally powerful data processing elements with equal access to various components included in computing device 110. In other embodiments, data processing elements 120 and 130 may have different amounts of data processing power. It should be appreciated that although no GPUs, FPGAs, or ASICS are present in the depicted embodiment, additional data processing elements including these other types of data processing elements other than CPUs or CPU cores may be present in other embodiments of the invention.

Workload distribution program 140 is a computer program which distributes the execution of a workload associated with data included in portions of an OLAP cube such as OLAP cube 150 to data processing elements such as data processing elements 120 and 130. In general, a workload is any computation task or set of computation tasks which involve at least a portion of the data included in OLAP cube 150. For example, in the depicted embodiment, the workload being distributed is an analysis of the average order value per sale based on the city in which the sale occurred, the product being purchased, and the month in which the purchase occurred to search for trends. In various embodiments, workload distribution program 140 distributes the workload across each of the data processing elements such that the execution of the workload is completed more quickly. In some embodiments, such as the depicted embodiment, where two equally powerful data processing elements are present, the workload is split as evenly as possible by workload distribution program 140 to be executed using both of the available data processing elements. In embodiments where two or more data processing elements with different data processing power are present, the portion of the workload distributed to each data processing element may be proportional to the power of that data processing element. For example, in an embodiment where data processing element 120 is twice as powerful as data processing element 130, data processing element 120 is assigned twice as large a portion of the workload as data processing element 130.

OLAP cube 150 is a multi-dimensional array of data including one or more dimensions, where each dimension includes one or more elements. For example, in one embodiment, OLAP cube 150 stores information related to the sales of three different products in three different cities over three months' time, and as a result includes three dimensions generally designated "city," "month," and "product." In various embodiments, more or less than three dimensions may be included in OLAP cube 150, and the one embodiment of OLAP cube 150 including three dimensions is not intended to be limiting. It should be appreciated that in various embodiments of the invention, there is no limit on the number of dimensions which can be included in OLAP cube 150, and that some embodiments may require thousands of dimensions or more to be included in OLAP cube 150. In general, an embodiment of OLAP cube 150 which includes "N" dimensions is referred to as an "N-dimensional cube". In the depicted embodiment, the dimension "city" includes the three elements "NY", "SF", and "Paris" representing the cities New York City, San Francisco, and Paris, respectively, as described in greater detail with respect to FIGS. 3 and 4. Additionally, the dimension "month" includes the three elements "Jan", "Feb", and "Mar" representing the months January, February, and March, respectively. Additionally, the dimension "product" includes the three elements "Red", "Yellow", and "Blue" representing a red product, yellow product, and blue product, respectively. In the depicted embodiment, each of the three dimensions included in OLAP cube 150 includes three elements; however, in other embodiments various dimensions may contain different numbers of elements, and each dimension present within OLAP cube 150 does not need to include the same number of elements.

Every portion of data included in OLAP cube 150 is identified by being included within one element of each dimension. For example, in the depicted embodiment, a portion of data indicating that 122 units were sold may be included in the "NY" element of the "city" dimension, the "Jan" element of the "month" dimension, and the "Yellow" element of the "product" dimension, indicating that a total of 122 units of the yellow product were sold in New York city in the month of January. In some embodiments, the information included in OLAP cube 150 may be represented by a table, or a tree diagram such as the tree diagram depicted and described in greater detail with respect to FIG. 4.

In various embodiments of the invention, different methods may be used for populating the data present in OLAP cube 150. In some embodiments, the data in OLAP cube 150 is populated by using rules to represent relationships between multiple data points present in OLAP cube 150. For example, in one embodiment a New York City store opens for business in the month of February, and as a result a rule is used to populate all data values corresponding to the month of January with a value of zero for sales data. In another embodiment where OLAP cube 150 is used to store the number of parts purchased by a company over two months, data related to a part which was never purchased is populated to a value of zero for each month using a rule. In other embodiments, the data in OLAP cube 150 is populated by exporting information from a database such as a SQL database belonging to a system used to collect data. For example, in one embodiment OLAP cube 150 stores information related to the weather in a specific location over time and is populated by importing information from a weather database stored on the internet. It should be appreciated that any known method for populating the data present in an OLAP cube can be used in various embodiments of the invention, and that the two methods for populating the data present in OLAP cube 150 are meant to be exemplary and are not intended to be limiting.

Additionally, it should be appreciated that although OLAP cube 150 is referred to as a "cube", OLAP cube 150 may include only two dimensions in some embodiments, and may be represented two-dimensionally in such embodiments as a result. The term "cube" does not imply that OLAP cube 150 must be represented as a three-dimensional object in every embodiment of the invention. It should be appreciated that in embodiments where OLAP cube 150 includes a number of dimensions other than three, representing OLAP cube 150 as a three-dimensional object may not be possible and that, in such an embodiment, OLAP cube 150 may include "N" number of dimensions and thus, may be represented as an N-dimensional object.

In the depicted embodiment, data processing elements 120 and 130, workload distribution program 140, and OLAP cube 150 are located on computing device 110. However, in other embodiments, data processing elements 120 and 130, workload distribution program 140, and/or OLAP cube 150 may be located externally and accessed through a communication network such as network 160. The communication network can be, for example, a local area network (LAN), a wide area network (WAN) such as the internet, or a combination of the two, and may include wired, wireless, fiber optic or any other connection known in the art. In general, the communication network can be any combination of connections and protocols that will support communications between computing device 110, data processing elements 120 and 130, workload distribution program 140, and OLAP cube 150 in accordance with a desired embodiment of the invention.

Figure 2:
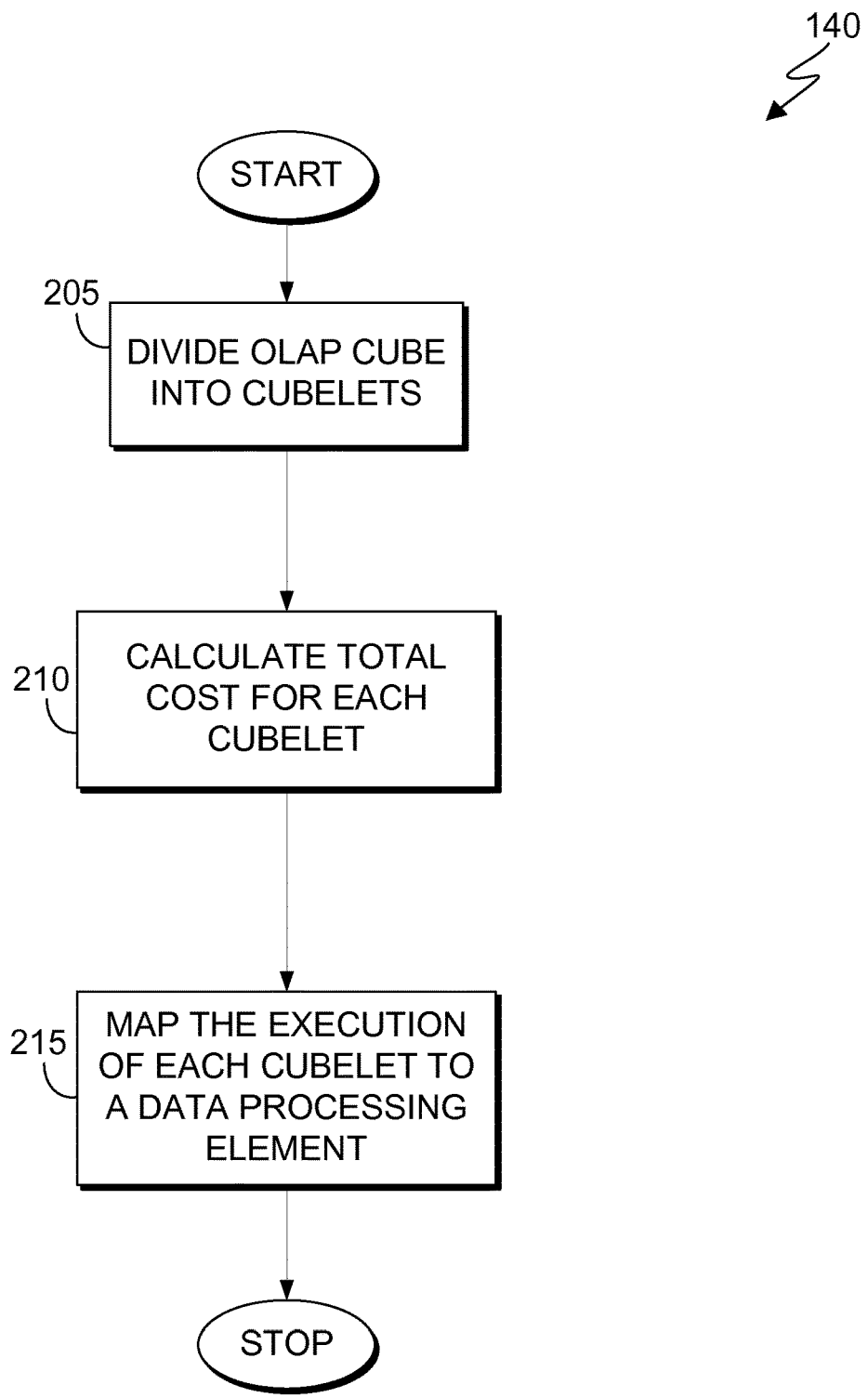
FIG. 2 is a flowchart depicting operational steps of the workload distribution program of FIG. 1, in accordance with an embodiment of the present invention.

FIG. 2 is a flowchart depicting the operational steps included in workload distribution program 140 for distributing the execution of a workload associated with data included in portions of an OLAP cube to data processing elements, in accordance with an embodiment of the present invention.

In step 205, workload distribution program 140 divides an OLAP cube such as OLAP cube 150 into one or more cubelets. Many methods are known for dividing an OLAP cube such as OLAP cube 150 into two or more cubelets, and in general any acceptable method for dividing OLAP cube 150 into two or more cubelets can be used in various embodiments of the invention. In one embodiment, a dimension of interest is selected and a separate cubelet is created corresponding to each element present within the dimension of interest. In general, it is not always possible that a cube can be divided into cubelets. Thus, we are assuming only those scenarios where this can be achieved.

In the depicted embodiment, OLAP cube 150 is divided into cubelets by creating a cubelet for each element present within the "city" dimension. This is achieved by using an acceptable method of dividing a cube into cubelets. After splitting OLAP cube 150 along the "city" dimension, one cubelet is present for each element included within the "city" dimension. For example, in the depicted embodiment, one cubelet for each of the elements "NY", "SF", and "Paris" is present after splitting OLAP cube 150 along the dimension "city". It should be appreciated that in the depicted embodiment, each cubelet represents a two-dimensional cross-section of OLAP cube 150, and that when combined, the cubelets include all of the data present within OLAP cube 150. In embodiments where the dimension of interest includes only one element, the one cubelet created by splitting OLAP cube 150 along the dimension of interest is equivalent to OLAP cube 150. The process of splitting an OLAP cube into one or more cubelets is illustrated and described in greater detail with respect to FIG. 3.

In step 210, workload distribution program 140 calculates the total cost associated with each cubelet created by workload distribution program 140 (see step 205). In various embodiments of the invention, the cost associated with a cubelet represents the amount of computation required for executing the portion of the workload associated with the corresponding cubelet. For example, if a company has been selling products in New York City for the past three months, but only has been selling products in Paris for the past four days, then it is expected that the NY cubelet will contain much more data than the Paris cubelet, and as a result require a correspondingly higher amount of computation as part of the workload. Additionally, the cost associated with each cubelet is determined dynamically based on the type of workload being distributed and executed. For example, embodiments of the invention where the workload being distributed involves determining the average of all of the data points present within a cubelet results in a first cost being determined for each cubelet, and a second workload where the workload being distributed involves determining the most repeated value present within each cubelet results in a second cost being determined for each cubelet.

Figure 4:
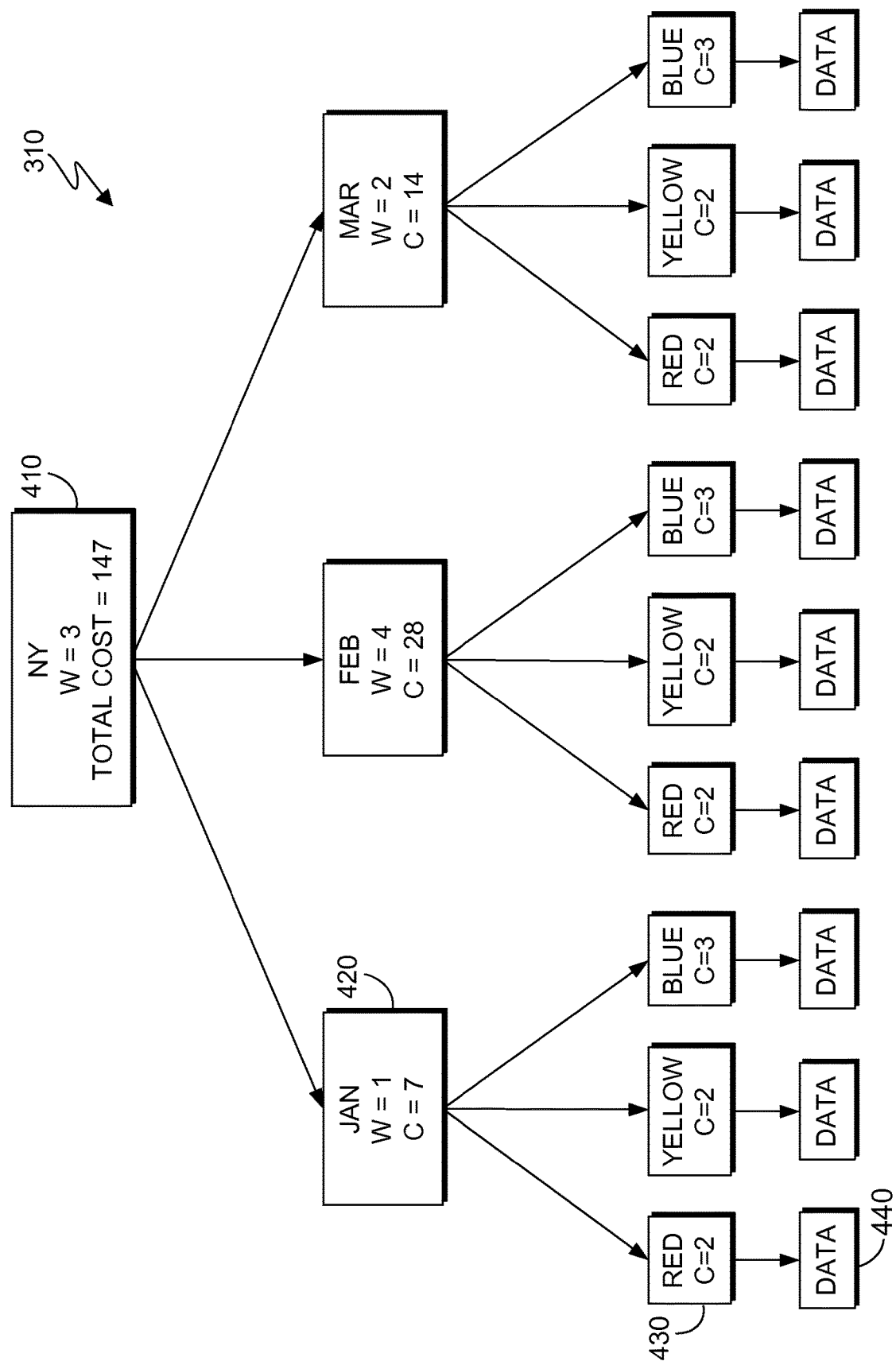
FIG. 4 is a block diagram depicting the data included in one of the cubelets of FIG. 3 represented as a tree diagram, in accordance with an embodiment of the present invention.

The process of calculating the cost associated with a cubelet is illustrated and described in greater detail with respect to FIG. 4.

In step 215, workload distribution program 140 maps the execution of the portion of the workload corresponding to each cubelet to a data processing element, such as data processing elements 120 and 130. Workload distribution program 140 distributes the workload based on the total cost computed for each cubelet (see step 210). In the depicted embodiment, the total cost associated with the "NY" cubelet (cubelet 310) is one hundred forty-seven, the total cost associated with the "SF" cubelet (cubelet 320) is fifty-four, and the total cost associated with the "Paris" cubelet (cubelet 330) is ninety-six. Additionally, in the depicted embodiment, data processing elements 120 and 130 are two cores of a dual-core processor with the same total data processing power and are capable of performing computation at the same rate. As a result, the objective of workload distribution program 140 is to distribute the total workload across the two data processing elements as evenly as possible. Although in the depicted embodiment it is not possible to distribute the workload perfectly evenly to both data processing elements based on the total cost computed for each cubelet, assigning the execution of the workload associated with the data included in the "NY" cubelet (cubelet 310) to data processing element 120 while assigning the portions of the workload associated with the data included in the "SF" and "Paris" cubelets (cubelets 320 and 330) to data processing element 130 yields as even a distribution as possible. In the depicted embodiment, a total cost of one hundred forty-seven is assigned to data processing element 120 while a total cost of one hundred fifty is assigned to data processing element 130. The process of determining the total cost for each cubelet is described in greater detail with respect to FIG. 4.

In embodiments where multiple dimensions of interest are selected, workload distribution program 140 compares the distributions which are possible using each dimension of interest in step 215 to determine the preferred dimension of interest. For example, in an embodiment where the dimension of interest can be selected from any of the three dimensions included in the depicted embodiment based on which ever dimension of interest provides the most even mapping, workload distribution program 140 compares the most even distributions of the workload possible using each potential dimension of interest. For example, in the depicted embodiment, the most even distribution possible using "city" as the dimension of interest is a total cost of one hundred forty-seven distributed to data processing element 120 and a total cost of one hundred fifty distributed to data processing element 130. Similarly, in this embodiment the most even distribution possible using "product" as a dimension of interest is a total cost of one hundred forty distributed to data processing element 120 and a total cost of one hundred fifty-seven distributed to data processing element 130. Additionally, in this embodiment the most even distribution possible using "month" as a dimension of interest is a total cost of one hundred forty-eight distributed to data processing element 120 and a total cost of one hundred-forty nine distributed to data processing element 130. Based on the possible distributions of the workload using these dimensions of interest, the final dimension of interest may be selected to be "month" because the difference between the total cost assigned to data processing elements has a minimum value of one using "month" as the dimension of interest.

Figure 3:
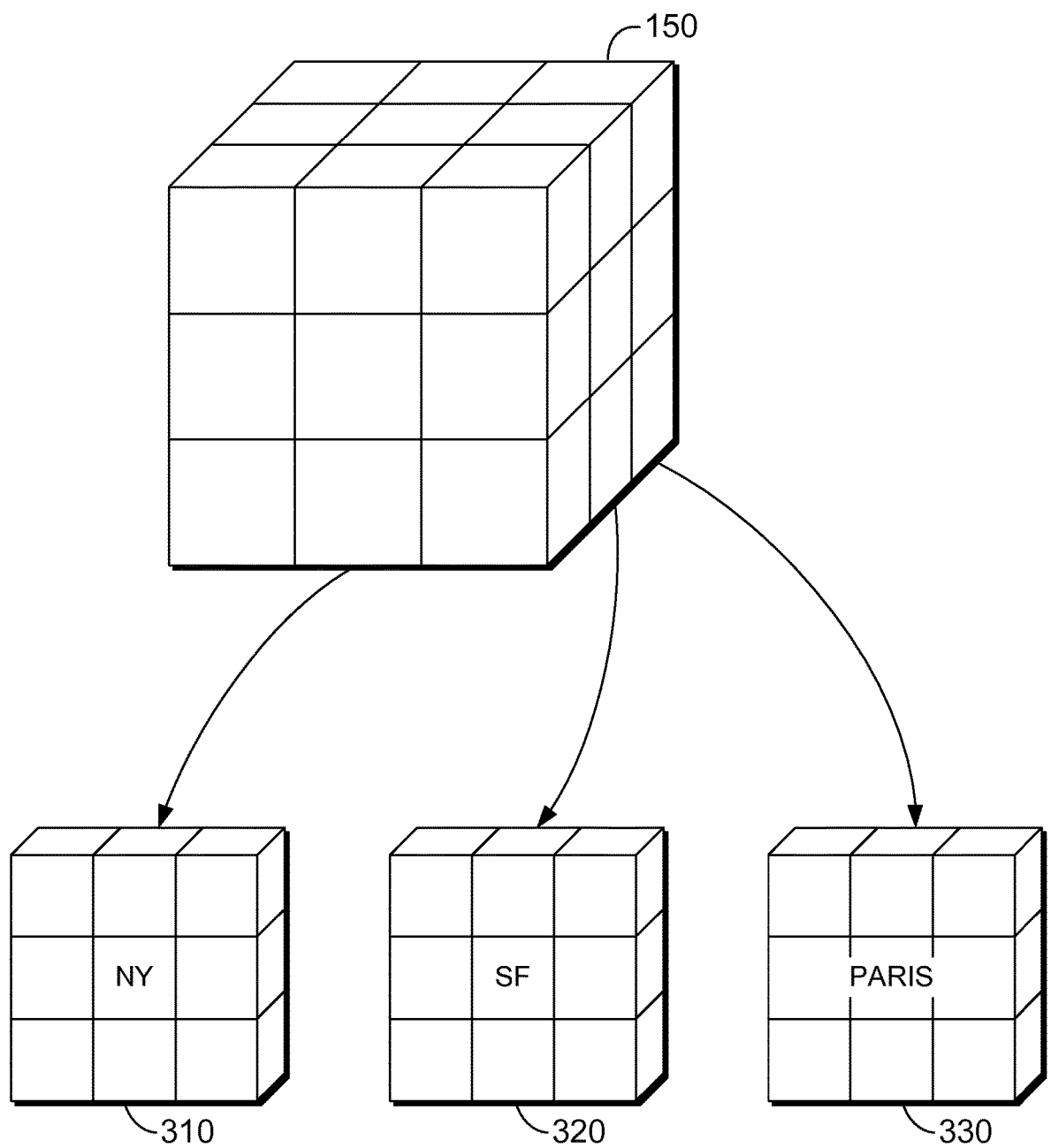
FIG. 3 is a block diagram depicting the operation of splitting an OLAP cube into three cubelets, in accordance with an embodiment of the present invention.

FIG. 3 is a block diagram depicting the operation of splitting OLAP cube 150 into cubelets 310, 320, and 330 in accordance with an embodiment of the present invention. In embodiments of the invention, such as the depicted embodiment where OLAP cube 150 includes three dimensions, OLAP cube 150 can be represented as a three-dimensional array of data where OLAP cube 150 is divided into a number of slices in each dimension corresponding to the number of elements present within that dimension. For example, in one embodiment OLAP cube 150 is divided into three slices in each dimension, corresponding to the three elements possible for each dimension such as the elements "Jan", "Feb", and "Mar" within the dimension "month". In general, the location of a portion of data corresponding to a specific element of each dimension is included at the intersection of the slices corresponding to those elements. For example, data related to the number of "Red" products sold in Paris in February is located at the intersection of the "red" slice, the "Feb" slice, and the "Paris" slice. In general, each block present within OLAP cube 150 corresponds to a single portion of data sharing the attributes of being a member of the same elements within each dimension.

FIG. 4 is a tree diagram depicting the process of calculating the total cost associated with each of the cubelets, in accordance with an embodiment of the present invention. It should be appreciated that FIG. 4 depicts an example of a tree diagram of one embodiment of a cubelet of OLAP cube 150 for illustration purposes, and is not intended to be limiting. The total cost for each cubelet is calculated using a weight associated with each element of each dimension included in the cubelet. It should be appreciated that a total cost for each cubelet is dynamically calculated based on the workload being distributed in that embodiment, and that the weights and total costs associated with each node or entire cubelet may change based on the workload being scheduled. As depicted in FIG. 4, the elements included in each "level" of the tree diagram depict the various elements of a given dimension present within cubelet 310. At the top level, only the element 410 ("NY") of the dimension "city" is present, due to the fact that the other elements of the "city" dimension are included in cubelets 320 and 330, and as a result are not present in cubelet 310. In the second level of the tree diagram, the elements within the dimension "month" which are included in cubelet 310 are listed. While in the depicted embodiment data is present for every element within the "month" dimension, in other embodiments such as an embodiment where no stores in New York City were open in the month of January, elements such as element 420 and all of the elements below them may be omitted. In the depicted embodiment, the total cost of executing the portion of the workload associated with cubelet 310 is determined by calculating the total cost of each element and the elements included within that element from the lowest level present in the tree diagram to the top level of the tree diagram. Additionally, it should be appreciated that elements in the third level such as element 430 include portions of data within those specific elements, and that the elements such as data element 440 present below the elements in the third level are meant to signify the presence of data within the elements in the third level, and not to indicate the presence of additional elements within another dimension of OLAP cube 150.

In various embodiments, the total cost associated with each element is calculated starting with the lowermost level of elements and working up to the uppermost level of elements. In the depicted embodiment, the third level of elements including elements such as element 430 is calculated first. In general, each element included within each dimension of OLAP cube 150 has a weight which represents the average amount of computation required for processing data included in the corresponding element. In various embodiments, elements present in the lowermost level of elements have only a cost associated with them, and not a weight. In these embodiments, each element within the lowermost level of elements has a cost corresponding to the amount of data included within that element. For example, in the depicted embodiment data related to the blue product sold by the company includes more information related to each customer than the red or yellow products sold by the company and as a result requires more computation time and resource usage to process the information related to each transaction. As a result of this additional included data, the cost associated with the "blue" element within the "product" dimension is three, while the costs associated with the elements "yellow" and "red" within the "product" dimension have a value of two. Further, in the depicted embodiment, the computation required for processing the information recorded in January is simpler than the computation required for processing the information recorded in February, so the elements corresponding to the two months have weights of one and four respectively. In various embodiments, weights can be determined automatically by additional software which examines the amount of time required to process information related to each element of each dimension and analyze trends in the collected data. In other embodiments, weights are input by a user based on properties such as the amount of information which must be processed, the performance of a storage device on which a portion of data related to a specific element is stored, or any property which affects the amount of time required to process the information included in a given element of OLAP cube 150.

In general, the cost of any elements above the lowest level of elements is equal to the sum of the cost of all included elements multiplied by the weight for that element. For example, the cost associated with element 420 is equal to the sum of the elements in the third level (2+2+3=7) multiplied by the weight for element 420 (1) which gives a total cost of 7 for element 420. Following the same formula, the cost associated with element 410 which represents the total cost associated with cubelet 310 is determined to be the sum of the costs of the elements in the second level (7+28+14=49) multiplied by the weight of element 410 (3) to yield a total cost of 147 for element 410.

Figure 5:
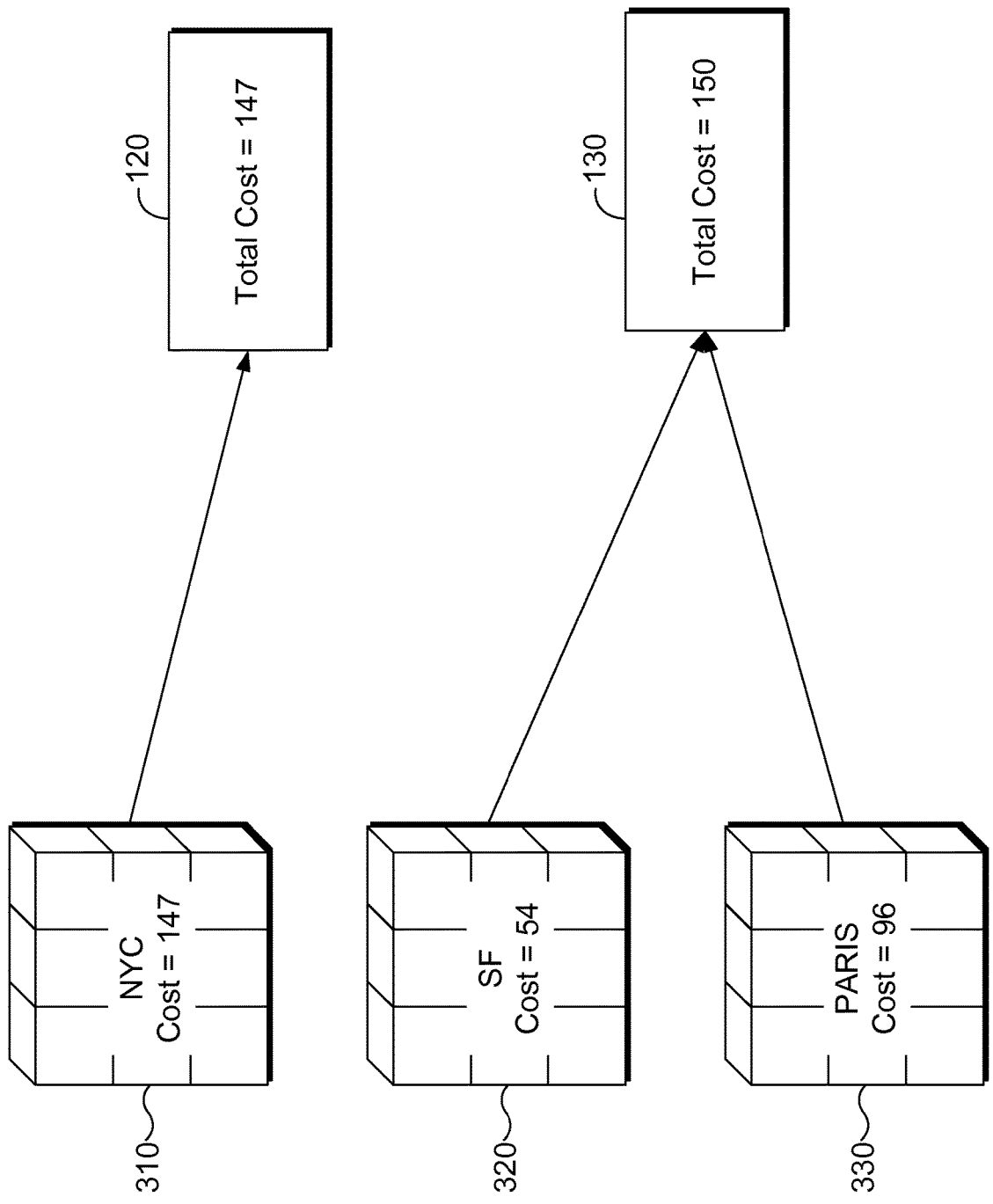
FIG. 5 is a block diagram illustrating the distribution of the processing of each cubelet of FIG. 3 to a computation resource of FIG. 1, in accordance with an embodiment of the invention.

FIG. 5 is a block diagram illustrating the distribution of the processing of each cubelet of FIG. 3 to a computation resource of FIG. 1, in accordance with an embodiment of the invention. The distribution of the workload is performed using the total cost computed for each cubelet in step 210. In the depicted embodiment, the total cost associated with the "NY" cubelet is 147, the total cost associated with the "SF" cubelet is 54, and the total cost associated with the "Paris" cubelet is 96. Additionally, in the depicted embodiment, data processing elements 120 and 130 are two cores of a dual-core processor with the same total data processing power and are capable of performing computation at the same rate. As a result, the objective of workload distribution program 140 is to distribute the total workload across the two data processing elements as evenly as possible. Although in the depicted embodiment it is not possible to distribute the workload perfectly evenly to both data processing elements based on the total cost computed for each cubelet, assigning the execution of the workload associated with the data included in cubelet 310 to data processing element 120 while assigning the portions of the workload associated with the data included in cubelets 320 and 330 to data processing element 130 yields as even a distribution as possible. In the depicted embodiment, a total cost of 147 is assigned to data processing element 120 while a total cost of 150 is assigned to data processing element 130.

Figure 6:
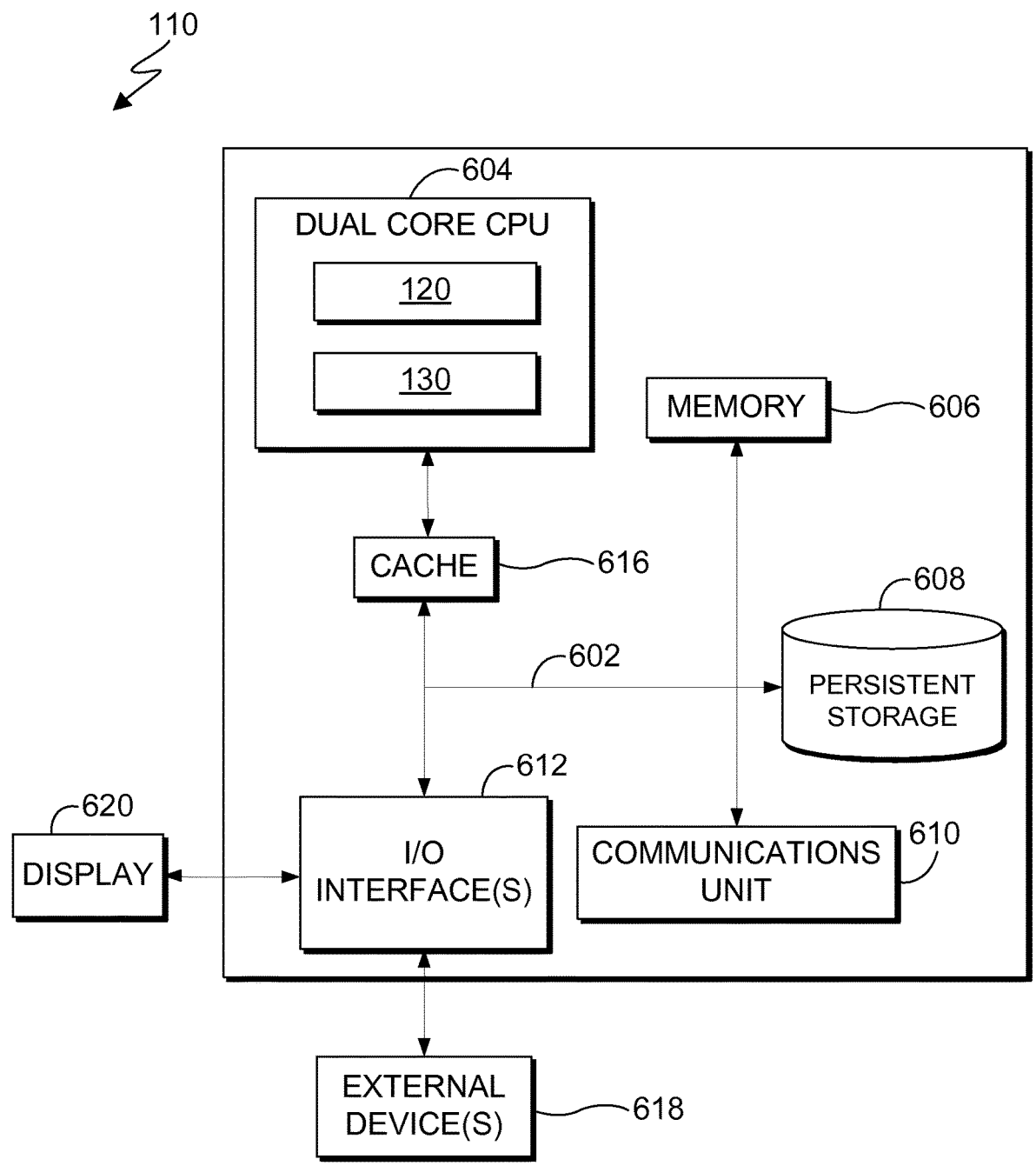
FIG. 6 is a block diagram illustrating the hardware components included in a computing device of FIG. 1 executing the workload distribution program, in accordance with an embodiment of the invention.

FIG. 6 depicts the components of computing device 110, which is an example of a computing device that includes workload distribution program 140 of embodiments of the present invention. Computing device 110 includes communications fabric 602, which provides communications between dual-core CPU 604, memory 606, persistent storage 608, communications unit 610, input/output (I/O) interface (s) 612, cache 616, data processing element 120, and data processing element 130. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data and data near accessed data from memory 606.

Program instructions and data used to practice embodiments of the present invention may be stored in persistent storage 608 for execution by one or more of the respective dual-core CPU(s) 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Processor(s) 604 includes data processing elements 120 and 130 which are data processing elements such as CPU cores capable of performing computation and executing computer-readable program instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for distributing a workload of an online analytical processing (OLAP) cube, the method comprising:
   querying an online database of information to populate the OLAP cube;
   dividing, by one or more processors, an online analytical processing (OLAP) cube into one or more cubelets, wherein a cubelet represents a dimension of the OLAP cube;
   determining, by one or more processors, a weight corresponding to each node present within each of the one or more cubelets based, at least in part, on the workload and the amount of data included within each respective node,
      wherein the determined weight relates to one or more elements present in a level of elements other than a lowermost level of elements;
   determining, by one or more processors, a total cost corresponding to each of the one or more cubelets,
      wherein the total cost is determined dynamically based on a type of workload being distributed and executed, and
      wherein the total cost is further based on the determined weight corresponding to each node present within each of the one or more cubelets, calculated by multiplying the weight of an element by a sum of a cost of one or more elements present in a level of elements other than a lowermost level of elements; and
   assigning, by one or more processors, execution of a first portion of a workload corresponding to a first one of the one or more cubelets to a first data processing element of a set of data processing elements and execution of a second portion of the workload corresponding to a second one of the one or more cubelets to a second data processing element of the set of data processing elements, wherein the assignment of the execution of the first and second portions of the workload is evenly distributed between the first and second data processing elements, based, at least in part, on the determined total cost corresponding to the respective cubelets.

2. The method of claim 1, wherein the OLAP cube includes one or more portions of data, and wherein each portion of the one or more portions of data is included within a cubelet of the one or more cubelets.

3. The method of claim 1, wherein determining the total cost corresponding to each of the one or more cubelets comprises:
   determining the total cost corresponding to each of the one or more cubelets based, at least in part, on the weight corresponding to each node present within the respective cubelet.

4. The method of claim 1, wherein each cubelet of the one or more cubelets includes unique information.

5. The method of claim 1, wherein the data processing element is selected from a group consisting of:
   a central processing unit;
   a graphics processing unit;
   a field-programmable gate array; and
   an application-specific integrated circuit.

6. A computer program product for distributing a workload of an online analytical processing (OLAP) cube, the computer program product comprising:
   one or more computer readable storage media and program instructions stored on the one or more computer readable storage media, the program instructions comprising:
   program instructions to query an online database of information to populate the OLAP cube;
   program instructions to divide an OLAP cube into one or more cubelets, wherein a cubelet represents a dimension of the OLAP cube;

program instructions to determine a weight corresponding to each node present within each of the one or more cubelets based, at least in part, on the workload and the amount of data included within each respective node, wherein the determined weight relates to one or more elements present in a level of elements other than a lowermost level of elements;

program instructions to determine a total cost corresponding to each of the one or more cubelets,
  wherein the total cost is determined dynamically based on a type of workload being distributed and executed, and
  wherein the total cost is further based on the determined weight corresponding to each node present within each of the one or more cubelets, calculated by multiplying the weight of an element by a sum of a cost of one or more elements present in a level of elements other than a lowermost level of elements; and program instructions to assign execution of a first portion of a workload corresponding to a first one of the one or more cubelets to a first data processing element of a set of data processing elements and execution of a second portion of the workload corresponding to a second one of the one or more cubelets to a second data processing element of the set of data processing elements, wherein the assignment of the execution of the first and second portions of the workload is evenly distributed between the first and second data processing elements, based, at least in part, on the determined total cost corresponding to the respective cubelets.

7. The computer program product of claim 6, wherein the OLAP cube includes one or more portions of data, and wherein each portion of the one or more portions of data is included within a cubelet of the one or more cubelets.

8. The computer program product of claim 6, wherein program instructions to determine the total cost corresponding to each of the one or more cubelets comprise:
  program instructions to determine the total cost corresponding to each of the one or more cubelets based, at least in part, on the weight corresponding to each node present within the respective cubelet.

9. The computer program product of claim 6, wherein each cubelet of the one or more cubelets includes unique information.

10. The computer program product of claim 6, wherein the data processing element is selected from a group consisting of:
  a central processing unit;
  a graphics processing unit;
  a field-programmable gate array; and
  an application-specific integrated circuit.

11. A computer system for distributing a workload of an online analytical processing (OLAP) cube, the computer system comprising:
  one or more computer processors, one or more computer readable storage media, and program instructions stored on the computer readable storage media for execution by at least one of the one or more processors, the program instructions comprising:
  program instructions to query an online database of information to populate the OLAP cube;
  program instructions to divide an OLAP cube into one or more cubelets, wherein a cubelet represents a dimension of the OLAP cube;
  program instructions to determine a weight corresponding to each node present within each of the one or more cubelets based, at least in part, on the workload and the amount of data included within each respective node, wherein the determined weight relates to one or more elements present in a level of elements other than a lowermost level of elements;
  program instructions to determine a total cost corresponding to each of the one or more cubelets,
    wherein the total cost is determined dynamically based on a type of workload being distributed and executed, and
    wherein the total cost is further based on the determined weight corresponding to each node present within each of the one or more cubelets, calculated by multiplying the weight of an element by a sum of a cost of one or more elements present in a level of elements other than a lowermost level of elements; and
  program instructions to assign execution of a first portion of a workload corresponding to a first one of the one or more cubelets to a first data processing element of a set of data processing elements and execution of a second portion of the workload corresponding to a second one of the one or more cubelets to a second data processing element of the set of data processing elements, wherein the assignment of the execution of the first and second portions of the workload is evenly distributed between the first and second data processing elements, based, at least in part, on the determined total cost corresponding to the respective cubelets.

12. The computer system of claim 11, wherein the OLAP cube includes one or more portions of data, and wherein each portion of the one or more portions of data is included within a cubelet of the one or more cubelets.

13. The computer system of claim 11, wherein program instructions to determine the total cost corresponding to each of the one or more cubelets comprise:
  program instructions to determine the total cost corresponding to each of the one or more cubelets based, at least in part, on the weight corresponding to each node present within the respective cubelet.

14. The computer system of claim 11, wherein each cubelet of the one or more cubelets includes unique information.

15. The computer system of claim 11, wherein the data processing element is selected from a group consisting of:
  a central processing unit;
  a graphics processing unit;
  a field-programmable gate array; and
  an application-specific integrated circuit.

* * * * *